US006886689B2

(12) United States Patent
Hohns et al.

(10) Patent No.: US 6,886,689 B2
(45) Date of Patent: May 3, 2005

(54) APPARATUS FOR CONTAINING AND DISPLAYING OBJECTS

(75) Inventors: William Allin Hohns, Oviedo, FL (US); Joseph Edgar Sherman, III, Orlando, FL (US)

(73) Assignee: Magnetix Corporation, Orlando, FL (US)

( * ) Notice: Subject to any disclaimer, the term of this patent is extended or adjusted under 35 U.S.C. 154(b) by 89 days.

(21) Appl. No.: 10/382,408

(22) Filed: Mar. 6, 2003

(65) Prior Publication Data

US 2004/0173479 A1 Sep. 9, 2004

(51) Int. Cl.⁷ .............................. B65D 85/30; B65D 5/52
(52) U.S. Cl. ............................... 206/308.3; 206/45.23; 206/425; 206/753
(58) Field of Search ............................. 206/308.3, 425, 206/753, 309, 45.23, 313, 737

(56) References Cited

U.S. PATENT DOCUMENTS

| 1,424,778 | A |   | 8/1922  | Sea |
|-----------|---|---|---------|-----|
| 1,424,779 | A |   | 8/1922  | Sea |
| 1,424,780 | A |   | 8/1922  | Sea |
| 1,424,781 | A |   | 8/1922  | Sea |
| 2,500,773 | A |   | 3/1950  | Robins |
| 4,162,007 | A |   | 7/1979  | Bothun et al. |
| 4,356,918 | A | * | 11/1982 | Kahle et al. ................. 206/759 |
| 4,444,314 | A |   | 4/1984  | Jacobsson |
| 4,615,445 | A | * | 10/1986 | Stocchiero ............... 206/308.3 |
| 4,684,019 | A |   | 8/1987  | Egly |
| 4,798,284 | A | * | 1/1989  | Wakelin ..................... 206/759 |
| 4,874,085 | A |   | 10/1989 | Grobecker et al. |
| 5,022,516 | A | * | 6/1991  | Urban et al. ................. 206/753 |
| 5,242,049 | A | * | 9/1993  | Mizuno et al. ........... 206/308.3 |
| 5,246,107 | A |   | 9/1993  | Long et al. |
| 5,423,424 | A | * | 6/1995  | Young, III ................... 206/425 |
| 5,772,019 | A |   | 6/1998  | Reed |
| 5,775,494 | A |   | 7/1998  | Taplin |
| 5,803,250 | A |   | 9/1998  | Mori |
| 6,419,082 | B1|   | 7/2002  | Frankeny |
| 2001/0000397 | A1 |   | 4/2001 | Rinde |

* cited by examiner

Primary Examiner—Bryon P. Gehman
(74) Attorney, Agent, or Firm—Norman A. Nixon; Beusse Brownlee Wolter Mora & Maire, P.A.

(57) ABSTRACT

An apparatus is provided for containing and displaying a plurality of objects, such as compact discs and/or digital video discs for example, that may include a back cover and a tray front coupled with the back cover in a hinged relation so that the back cover and tray front may be articulated between an open position and a closed position. A tray seated in a hinged relation within a base portion of the tray front may be provided wherein the tray may be articulated between a first position and a second position when the apparatus is in the open position. A cartridge may be included that may be removably inserted within the tray. The cartridge may include a base portion have a first plurality of slots for receiving a lower edge of a plurality of respective discs. The cartridge may also include a pair of flexible arms extending from the base portion and spaced sufficiently apart so that as a disc is inserted within the cartridge the arms are urged away from each other to create a force against the lateral edges of the discs and grasp them within the cartridge. Each arm may include a plurality of slots for receiving the lateral edges of respective discs and aligning the discs with first plurality of slots.

24 Claims, 4 Drawing Sheets

APPARATUS FOR CONTAINING AND DISPLAYING OBJECTS

BACKGROUND OF THE INVENTION

This invention relates in general to apparatus for containing and displaying objects in a single container and more specifically to an apparatus for containing a plurality of objects and displaying them for secure shipping and storage and for ease of viewing and removal from the apparatus.

The music, movie and electronic publishing industries have contributed significantly to the proliferation of compact discs ("CD") and digital versatile discs ("DVD") in the marketplace. The music recording industry typically distributes music on single CDs packaged in well-known CD cases and, to a lesser extent, on multiple CDs packaged in customized cases as well. Segments of the electronic publishing industry also distribute multi-disc versions of a wide range of publications such as voluminous books. Securing multi-disc publications in a container for shipping is very important for maintaining the discs' integrity so that electronic data stored on a disc is not damaged.

Many multi-disc cases employ individual sleeves within which discs are enclosed and/or stacking the discs within the case so that all the center holes of the discs are collinear. Such cases may provide security for the discs during transport and storage but do not allow for the discs to be conveniently displayed for an end user to view individual discs without removing them all from the case.

It is also known to package other objects or a plurality of objects such as books, cassettes, floppy disks, cosmetics and/or greeting cards, for example, for shipping, storage and retail sale. Frequently such packaging includes shrink wrapping the objects together and/or packaging them in a container such that all objects must be removed in order to view each object individually. In this respect, an end user cannot easily view all objects in the container and select one object for use without removing all objects from the container or manipulating other objects to make room for selection and removal.

BRIEF SUMMARY OF THE INVENTION

In view of the above, it would be advantageous to provide a lightweight but durable apparatus for securely containing one or more objects, such as CDs or DVDs for example, for transport and storage. It would also be advantageous to provide such apparatus so that it can be conveniently opened and used to display the objects for sale and/or for allowing an end user to easily select, remove and replace one or more objects contained in the apparatus without disturbing the other objects. It would be further advantageous to provide the apparatus with printed artwork, graphics and/or text that is cost effective to produce and that enhances the overall aesthetic and artistic appeal of the apparatus.

One aspect of the present invention allows for an apparatus for containing and displaying at least one object to exhibit artistic and aesthetic appeal when displaying an object for sale in a retail store, for example. This may be accomplished by using artwork on printed material integral with the apparatus, which may help to attract consumers to the product and clearly convey the content of the item or items for sale. This may be accomplished by using printed material that fits within exemplary embodiments of a back cover and tray front of the apparatus so that a portion of the printed material may be viewed from all outer surfaces of the apparatus, for example.

Another aspect allows for containing objects, such as CDs or DVDs for example, within the apparatus in a manner that allows an end user to easily select, remove and replace one or more objects from an array of objects displayed in the apparatus. In this respect for example, an end user may quickly and easily switch discs when listening to a published book or watching a multi-disc feature film.

In accordance with one aspect of the present invention, an apparatus is provided for containing and displaying objects that may include a back cover having a back panel and a pair of lateral flanges. A tray front having a distal end and a base portion may be connected with the back cover in a hinged relation so that the back cover and tray front may be articulated between an open position and a closed position. The tray front may include a distal flange integral with the distal end of the tray front wherein the distal flange is seated proximately between a pair of respective upper ends of the pair of lateral flanges when the back cover and the tray front are in the closed position. Means for containing or grasping an object in the tray front may be provided so that when the back cover and the tray front are articulated to the open position the object may be openly displayed and may be removed from the apparatus. One aspect allows for the means for containing to include a pair of flexible arms extending from the base portion of the tray front and sufficiently spaced from each other so that when an object is inserted there between a sufficient force is created against the object to secure it between the pair of flexible arms.

Another aspect of the present invention allows for the means for containing the object to be a cartridge that may be removably inserted into a tray connected in a hinged relation to the base portion of the tray front. Connecting the tray in a hinged relation allows for the tray to be tilted forward when that apparatus is in the open position to allow for the object to be removed without the distal flange of the tray front interfering with the object being removed. This also allows for an object or objects to be displayed at a plurality of angles to the horizontal when the apparatus is open.

One exemplary embodiment of an apparatus in accordance with aspects of the present invention is provided for containing and displaying a plurality of media discs. The apparatus may include a back cover and a tray front coupled with the back cover in a hinged relation so that the back cover and tray front may be articulated between an open position and a closed position. A tray may be seated in a hinged relation within a base portion of the tray front wherein the tray may be articulated between a first position and a second position when the apparatus is in the open position. Means for containing or grasping a plurality of media discs within the tray may also be provided.

One aspect allows for the containing means to include a removable cartridge insertable within the tray. The removable cartridge may include a base and a first plurality of slots integral to the base for receiving a lower edge of a respective media disc when inserted within the cartridge. The containing means may further include means for grasping the plurality of media discs, such as along their respective lateral edges, when the discs are inserted within respective ones of the plurality of slots. One aspect allows for the grasping means to include a pair of arms or wings integral with the base of the cartridge and sufficiently spaced apart for receiving the plurality of discs there between. At least one of the arms may be sufficiently flexible to be urged away from the other arm when a disc is inserted there between so that a force is created grasping or securing the disc by its lateral edges between the pair or arms. An alternate aspect allows for each of the arms to be sufficiently flexed away from the other arm as a disc is inserted there between to create a force against the lateral edges of the respective disc and grasp or secure the disc between the pair of arms.

DETAILED DESCRIPTION OF THE INVENTION

Figure 1:
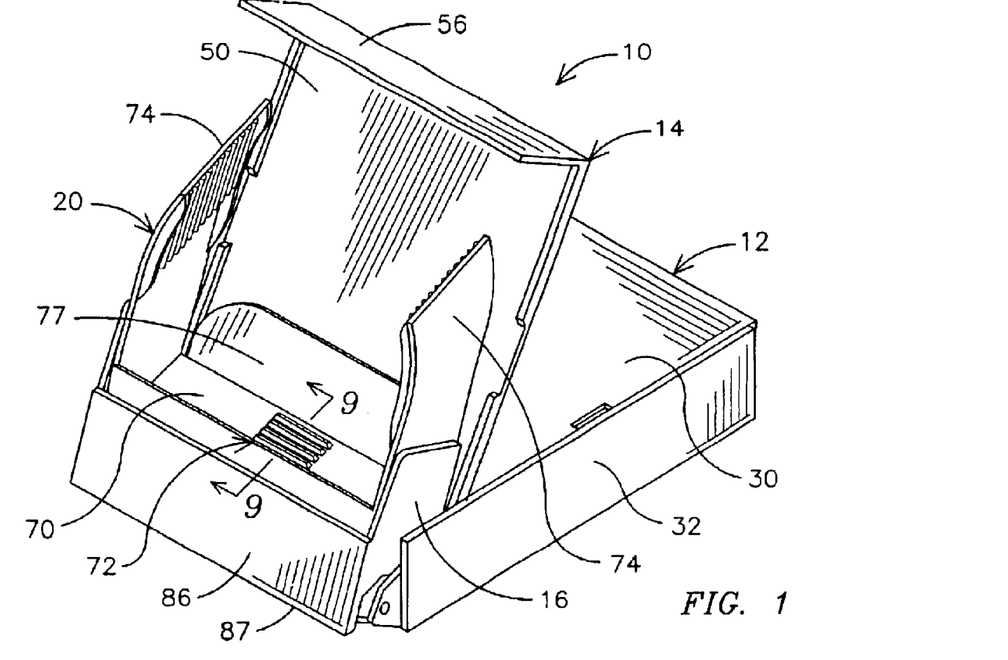
FIG. 1 illustrates a perspective view of one exemplary embodiment of an apparatus for containing and displaying a plurality of objects.

FIG. 1 illustrates a perspective view of an exemplary embodiment of an apparatus 10 for containing and displaying a plurality of objects such as electronic media discs, which may include CDs and/or DVDs for example. One aspect allows for the apparatus 10 to include a back cover 12 coupled with a tray front 14 in a hinged relation. This allows for the apparatus 10 to be opened and closed by articulating the back cover 12 and tray front 14 between an open position and a closed position. The apparatus 10 is shown in the open position in FIGS. 1 and 2. In this respect, when the back cover 12 and tray front 14 are articulated to the open position a plurality of objects may be displayed openly. That is, the objects are displayed for viewing and/or removal from the apparatus 10 by an end user. One aspect allows for the objects to be displayed in a stepped or cascade relation so that an end user may easily select, remove and/or replace one or more of the objects contained in the apparatus 10 without being interfered with by other objects in the apparatus 10. The objects may be contained in a tray 16 seated in a hinged relation within a base portion 18 of the tray front 14. One exemplary embodiment allows for the tray 16 to be articulated between a first position and a second position when the apparatus 10 is open. This allows for an object or objects to be displayed at a plurality of angles to the horizontal such as when the back cover 12 is placed on a substantially horizontal surface when the apparatus 10 is open, for example. Alternate embodiments allow for the tray 16 to be formed in fixed relation to the tray front 14, for example, as a function of the size, shape and other physical properties of the objects being contained in the apparatus 10. Means for containing and/or grasping an object or plurality of objects within the tray 16 may be provided such as a cartridge 20 that may be removably inserted and seated within the tray 16.

Figure 2:
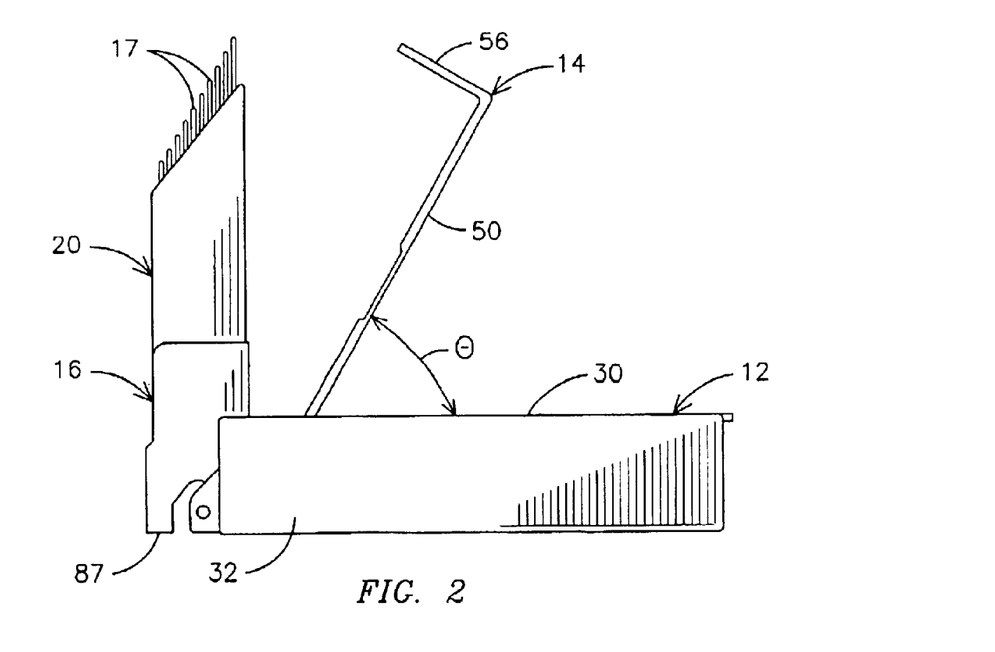
FIG. 2 illustrates a side view of the exemplary embodiment of FIG. 1.

As shown in FIG. 2, one aspect allows for the means for containing the plurality of objects, such as CDs and/or DVDs 17 for example, within the tray 16 to be configured to contain the objects in a stepped or cascade relation. This arrangement allows for an upper portion or edge of each object to ascend in height relative to the previous one from front to back of apparatus 10 when displayed in apparatus 10 in its open position. Alternate aspects allow for the objects to be contained in other relative arrangements such as by containing them side-by-side with their respective upper edges or surfaces lying in the same horizontal plane when displayed. For example, the means for containing or grasping objects, such as cylindrical containers for cosmetics, could be contained and displayed in a side-by-side or tiered relation where the containers are contained by a friction fit within respective recesses formed in the tray 16. Other arrangements will be recognized by those skilled in the art and may be adapted for containing and displaying books, greeting cards, cassettes, floppy discs, digital camera discs or numerous other objects having various shapes and sizes. Alternate means for containing or grasping the plurality of objects within the tray 16 will be recognized by those skilled in the art and may include, by way of example, affixing the cartridge 20 directly to the base portion 18 of the tray front 14 or otherwise manufacturing the cartridge 20 as part of the tray front 14 rather than inserting the cartridge 20 into the tray 16. Another alternate embodiment allows for the means for containing to be formed integral with the tray front 14 such as by forming it within the base portion 18, for example. The means for containing may be formed in other portions of the tray front 14 as a function of the physical properties of the object or objects being contained.

Figure 3:
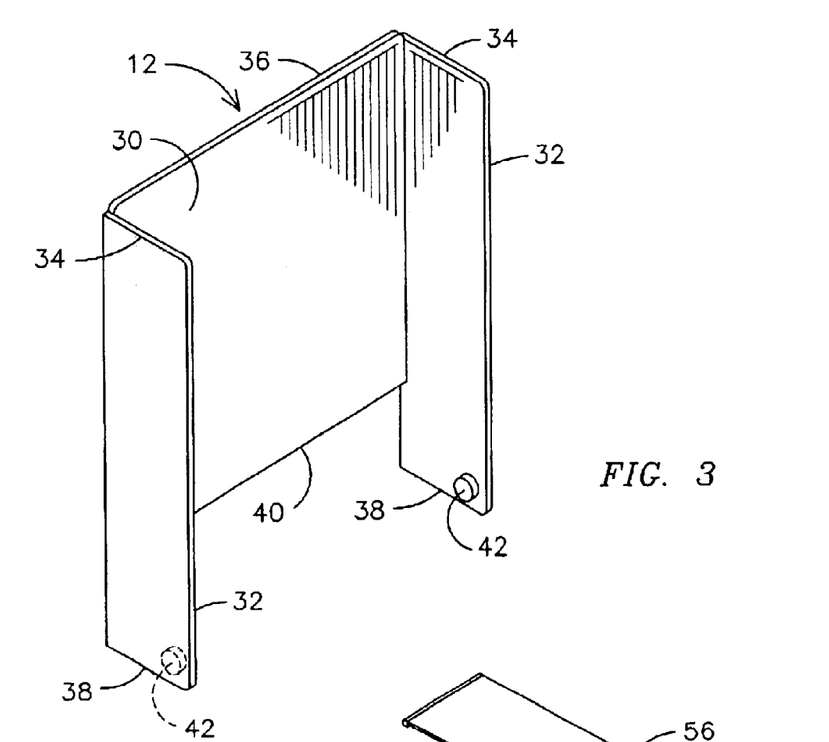
FIG. 3 illustrates a perspective view of an exemplary embodiment of a back cover of the apparatus of FIG. 1.

FIG. 3 illustrates a perspective view of an exemplary embodiment of the back cover 12, which may include a back panel 30 and a pair of lateral flanges 32. The pair of lateral flanges 32 may extend substantially perpendicularly from the back panel 30 with an upper end 34 of each flange 32 being substantially flush with an upper end 36 of the back panel 30. Alternate embodiments allow for the upper ends 34 of one or both flanges 32 to be recessed below the upper end 36 of the back panel 30. Each flange 32 may be sized so that a lower end 38 of each flange 32 extends below or overhangs a lower end 40 of the back panel. The amount of overhang between the lower end 40 of the back panel 30 and the lower ends 38 of the flanges 32 allows for the tray front 14 to be articulated into an open position as will be more fully described below. Each flange 32 may include a protuberance 42 proximate to their respective lower ends 38 that allow for the back cover 12 to matingly engage the tray front 14 in a hinged relation. This allows for the back cover 12 and the tray front 14 to be articulated between the open and closed positions.

Figure 4:
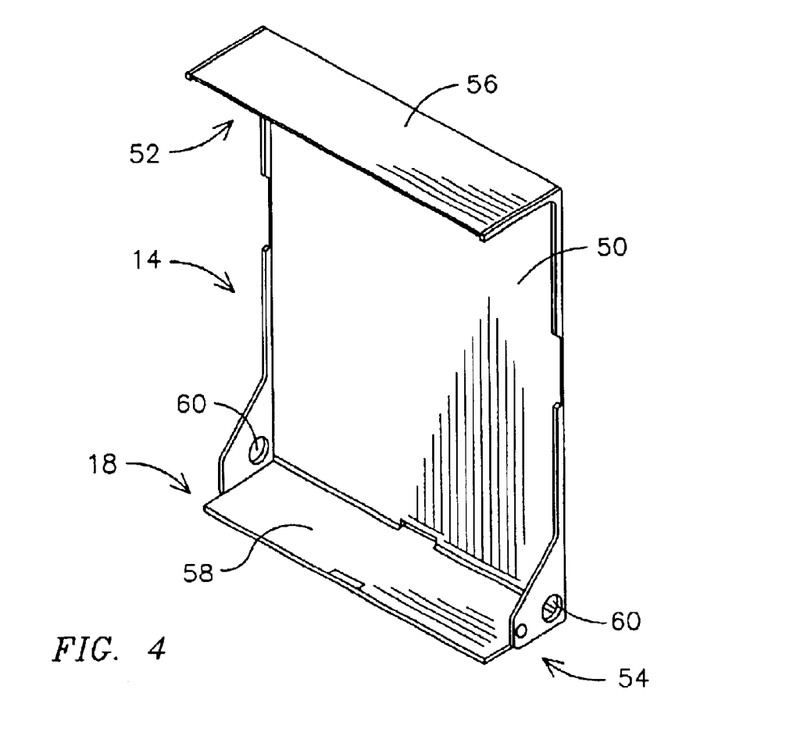
FIG. 4 illustrates a perspective view of an exemplary embodiment of a tray front of the apparatus of FIG. 1.
Figure 5:
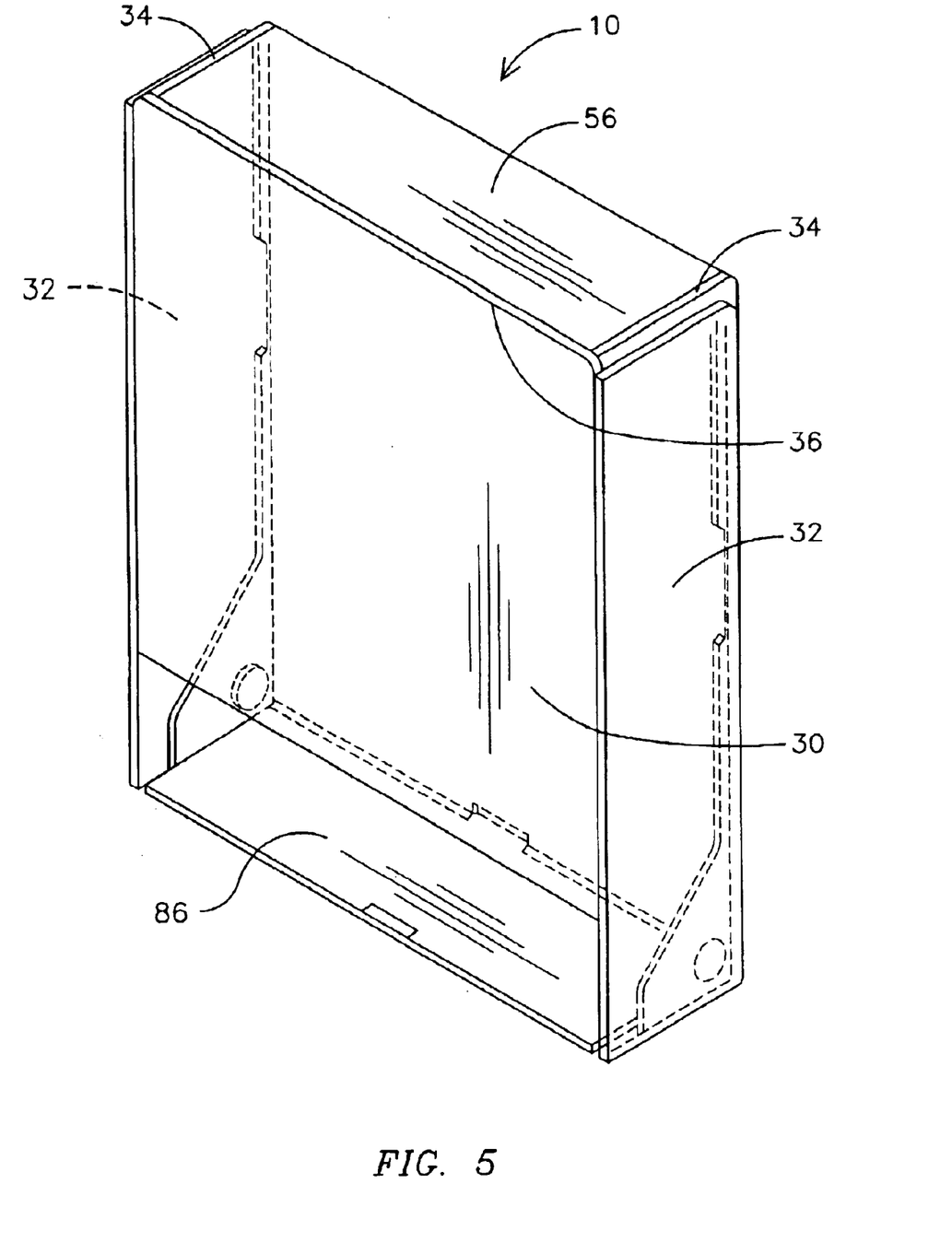
FIG. 5 illustrates a perspective view of an exemplary embodiment of the apparatus of FIG. 1 in a closed position.

FIG. 4 illustrates a perspective view of an exemplary embodiment of the tray front 14, which may include a front panel 50 having a distal end 52 and a proximal end 54. One aspect allows for a distal flange 56 to extend substantially perpendicularly from the distal end 52 and a proximal flange 58 to extend substantially perpendicularly from the proximal end 54 of the front panel 50. In this respect, when the apparatus 10 is in the closed position, as shown in FIG. 5, a plane defined by the distal flange 56 is substantially perpendicular to the respective planes defined by the pair of lateral flanges 32 and the plane defined by the distal flange 56 is substantially flush with the upper ends 34 of the back cover's 12 lateral flanges 32 and the upper end 36 of the back panel 30. Alternate embodiments allow for the plane defined by the distal flange 56 to be recessed below the upper ends 34 and 36 when the apparatus 10 is in the closed position or it could extend above those upper ends, for example. When the apparatus 10 is articulated from the closed to open position the distal flange 56 is separated from the pair of lateral flanges 32. Alternate embodiments allow for the distal flange 56 to be affixed to the back panel 30 so that the plane defined by that flange is flush with upper ends 34 and 36 of the lateral flanges 32 and the back panel 30. In this embodiment, the distal flange 56 would be affixed to the back cover 12. The tray front 14 may include apertures 60, for example, for receiving the protuberances 42 to matingly engage the back cover 12 with the tray front 14 in a hinged relation. Alternate means for coupling the back cover 12 to the tray front 14 in a hinged relation will be recognized by those skilled in the art.

One exemplary embodiment of apparatus 10 allows for the back cover 12 and the tray front 14 to form a six-sided enclosure, such as a rectangular box, when in the closed position. One aspect allows for a first insert 64, shown in FIG. 6, to be inserted into the back cover 12 and a second insert 64 to be inserted into the tray front 14. Insert 64 may be folded approximately along folds 65, for example, for insertion into the back cover 12 and/or the tray front 14. In this respect, when the back cover 12 and the tray front 14 are in the closed position at least a portion of the first insert 64 and the second insert 64 may be received by and viewable within each of the six sides from the exterior of the apparatus 10 when closed. For example, the apparatus 10 may be fabricated of a transparent composition that allows for one side of the inserts 64 to be viewed from the exterior surfaces of the apparatus 10. The inserts 64 may include printed matter on both sides, for example, so that one side is viewable from the exterior when the apparatus 10 is closed and the other side may be viewed as well when the apparatus 10 is open. One exemplary embodiment allows for configuring the inserts 64 so that they have no die-cuts, which allows for easier insertion and may reduce the cost of producing each apparatus 10 relative to configurations that require die-cut inserts. One exemplary embodiment allows for using only one insert 64 or for the first and second inserts 64 to have the same or substantially the same dimensions, or at least one common dimension such as that which would fit the width of the back panel 30 and the height of the front panel 50 for example, while other exemplary embodiments allow for the respective dimensions to be different. Alternate embodiments of inserts will be recognized by those skilled in the art. Means for holding an insert 64 in place may be provided such as one or more appropriately placed insert clips (not shown). One exemplary means for holding an insert may be affixed to the inside surface of each lateral flange 32 of the back cover 12, for example. Alternate means will be recognized by those skilled in the art.

Figures 6, 7, 8, 9:
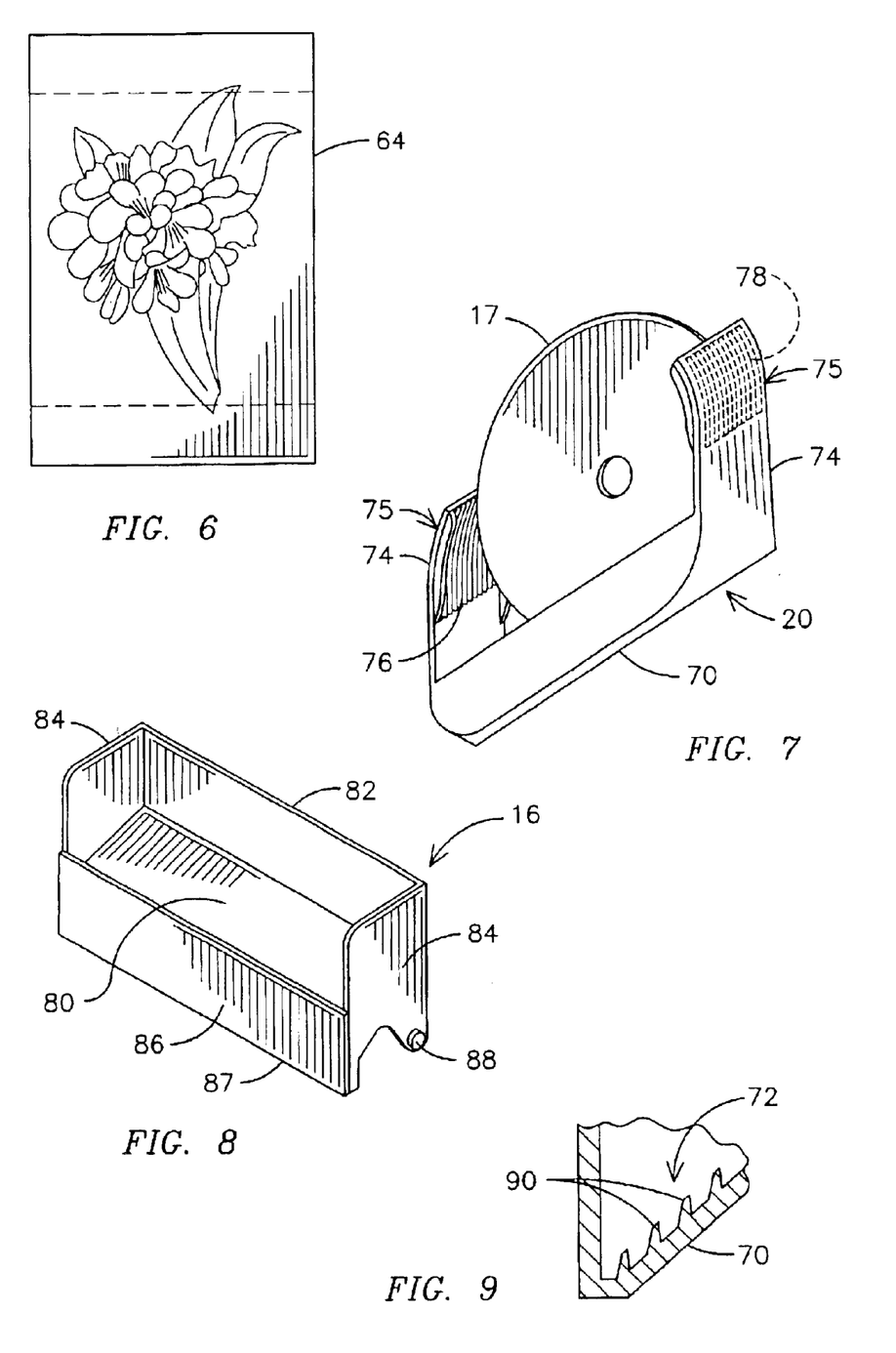
FIG. 6 illustrates an exemplary embodiment of an insert that may be used with the apparatus of FIG. 1.
FIG. 7 illustrates a perspective view of an exemplary embodiment of a removable cartridge that may be used with the apparatus of FIG. 1.
FIG. 8 illustrates a perspective view of an exemplary embodiment of a tray that may be used with the apparatus of FIG. 1.
FIG. 9 illustrates an enlarged cross section of a base portion of the cartridge of FIG. 7 taken along line A—A of FIG. 1.

FIG. 7 illustrates a perspective view of an exemplary embodiment of a removable cartridge 20 that may be removably inserted within the tray 16. One exemplary embodiment allows for the cartridge 20 to include a base 70 and a first plurality of slots 72, as best shown in FIG. 1, integral to the base 70 for receiving a lower edge of a respective media disc, for example, when inserted within the cartridge 20. Means for grasping or containing a plurality of objects, such as media discs, when inserted within the plurality of slots may be provided. The means for grasping or containing may include a pair of arms 74 that may be integral with and extend from the base 70 in a substantially parallel manner. One aspect allows for the arms 74 to be sufficiently spaced apart for receiving one or more of the plurality of media discs there between. In this respect, at least one of the arms 74 may be sufficiently flexible to be urged away from the other arm 74, which may be rigid, when a media disc is inserted there between. This allows for a force to be created against at least one lateral edge of the media disc to grasp or secure the disc between the pair or arms 74. Another aspect allows for each of the arms 74 to be flexible and sufficiently flexed away from the other arm 74 as a media disc is inserted there between to create a force against the lateral edges of the respective disc and grasp or secure the disc between the pair of arms 74. Cartridge 20 may also include a back plate 77 as best shown in FIG. 1.

The means for containing or grasping may further include a second plurality of slots 76 that may be integral to at least one of the pair of arms 74. The second plurality of slots 76 may align with or otherwise correspond to the first plurality of slots 72. This allows for the lateral edge of a media disc to be inserted within a respective one of the second plurality of slots 76 and guided into the corresponding respective slot of the first plurality of slots 72 in the base 70 of cartridge 20. Another exemplary embodiment may include a third plurality of slots 78 that may be integral with a second one of the pair of arms 74. In this respect, the first plurality of slots 72, the second plurality of slots 76 and the third plurality of slots 78 may align with or correspond to each other to define a respective plurality of substantially parallel planes for securing the plurality of media discs between the arms 74. Each respective disc may be held within respective ones of the parallel planes when inserted within respective slots defining the respective parallel planes. Various combinations of 72, 76 and 78 may be used such as combining slots 76 and 78 and removing slots 72, for example. One exemplary embodiment allows for one or both of the arms 74 to include an arcuate or curvilinear distal end 75. For example, at least a portion of the distal ends 75 may be formed with a radius of curvature that is substantially equal to the radius of curvature of a standard media disc 17. Alternate embodiments allow for the distal ends 75 of the pair of arms 74 to be substantially linear provided they are sufficiently spaced apart to grasp or contain the plurality of media discs there between. Means may also be provided for ensuring that when one media disc 17 is removed from the cartridge 20 that other media discs 17 contained therein do not become dislodged from their respective slots. For example, each respective slot within the distal ends 75 of the pair of arms 74 may be configured as a "living hinge" so that when one media disc 17 is removed from a respective slot the pair of arms 74 remain sufficiently flexed together to retain any remaining discs 17 there between. Means may also be provided for positively urging the pair of arms 74 toward each other when the apparatus 10 is in the closed position. For example, one or more clips (not shown) affixed to the inside of that lateral flanges 32 of the back cover 12 may engage the outer surfaces of the pair of arms 74 while apparatus 10 is being closed to urge the arms 74 toward each other. In this respect, each clip may include a cam surface that engages the arms 74. Alternate means for urging the pair of arms 74 toward each other when apparatus 10 is closed will be recognized by those skilled in the art.

Alternate means for containing or grasping an object or objects may be provided as will be recognized by those skilled in the art, which may be a function of the number and physical properties, for example, of the object or objects to be contained within the apparatus 10. For example, one alternate embodiment may include an appropriately sized means for containing, such as a rack, affixed to the underside of the front panel 50 so that when the apparatus 10 is open a row of cosmetic containers, for example, would be contained within the rack and displayed. Such a rack could be affixed midway up the front panel 50 or at other appropriate places.

One aspect of the present invention allows for the back cover 12 and the tray front 14 to be configured so that when apparatus 10 is open it may be placed on a surface for displaying the objects contained therein. In this respect, when the back cover 12 and the tray front 14 are in the open position, as shown in FIGS. 1 and 2, the tray front 14 may rest against the lower end 40 of the back panel 30 and extend in a plane that may be oblique to a plane defined by the back panel 30. As shown in FIG. 2, one exemplary embodiment allows for an angle θ to be defined between respective planar surfaces of the front panel 50 of the tray front 14 and the back panel 30 of the back cover 12 when the apparatus 10 is open and set on a flat surface, for example. In this position the plurality of media discs 17 may be openly displayed in a stepped or cascade relation, for example. The tray front 14 may rest against the lower edge 40 of the back panel 30 when apparatus 10 is open to define the angle θ. Alternate embodiments allow for angle θ to vary as a function of the object or objects being displayed. FIG. 2 illustrates apparatus 10 open with tray 16 tilted forward in its first position in a plane that is substantially perpendicular to the plane defined by the back panel 30 of the back cover 12. In this position the media discs 17 may be displayed in substantially vertical planes with their respective upper edges "cleared" from interfering with the distal flange 56 of the tray front 14 for easy access, removal and/or replacement. The tray 16 may be articulated into its second position, in which case the planes defined by the discs 17 would be substantially parallel to the front panel 50 of the tray front 14. With the tray 16 in its second position the discs may be openly displayed at an angle to the horizontal, which may provide an advantageous viewing angle for consumers evaluating the discs 17 in a retail setting, for example. Tilting tray 16 allows for an object or objects to be displayed at a plurality of angles relative to the horizontal.

FIG. 8 illustrates a perspective view of an exemplary embodiment of a tray 16 that may include a base or seat 80, a back 82, a pair of lateral panels 84 and a front flange 86. The front flange 86 may be sized so that when the back cover 12 and tray front 14 are closed the front flange 86 will accommodate the space defined by the overhang between the lower end 40 and the distal ends 38 of the back cover 12. In this respect, the front flange 86 will form a substantially planar surface with the planar surface of the back cover 12 when the apparatus 10 is closed. Text or graphics may be embossed on the front flange 86 and an alternate embodiment allows for printed matter to be displayed via a printed insert on or within the front flange 86, for example. A lower ridge 87 of the front flange 86 may rest against a surface and support the tray 16 in its first position when the apparatus 10 is open. One aspect allows for the seat 80 to be angled relative to the horizontal for receiving the base 70 of the cartridge 20. The seat 80 and base 70 may have the same angles to the horizontal to achieve the stepped or cascade relation of the discs 17 when contained within the cartridge 20 with the cartridge 20 inserted or seated within the tray 16. Tray 16 may include protuberances 88 that may matingly engage the apertures 60 in the base portion 54 of tray front 14 in a hinged relation. This allows for the tray 16 to be articulated between the first position and the second position. Alternate embodiments allow for the seat 80 of tray 16 and the base 70 of cartridge 20 to be formed at varying angles to the horizontal, and may even be horizontal, depending on the objects being contained and/or displayed in the apparatus 10. An alternate embodiment allows for the lateral planels 84 of the tray 16 to extend above back 82 and engage the cartridge 20 in a locking engagement to secure the cartridge 20 within the tray 16.

FIG. 9 illustrates an exemplary cross section of the base 70 of the cartridge 20 to illustrate an enlarged exemplary embodiment of the first plurality of slots 72. One aspect allows for the slots 72 to be defined by a plurality of ridges or ribs 90 formed integral with the base 70 that may have varying heights as a function of the physical characteristics of the objects being contained there between. Alternate embodiments allow for various configurations and quantities of slots 72, or removal of the slots 72, as a function of the object or objects being contained in and/or displayed by the apparatus 10.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

We claim:

1. An apparatus for containing and displaying a plurality of media discs, the apparatus comprising:
   a back cover;
   a tray front coupled with the back cover in a hinged relation so that the back cover and tray front may be articulated between an open position and a closed position wherein the apparatus may be used to display the plurality of media discs when the tray front and the back cover are in the open position; and
   means for containing the plurality of media discs within the tray front comprising:
   a tray seated within a base portion of the tray front;
   a cartridge removably insertable within the tray, the cartridge comprising:
   a base;
   a first plurality of slots integral to the base for receiving a respective lower edge of a respective media disc when inserted within the cartridge; and
   means for grasping the plurality of media discs when inserted within the plurality of slots.

2. The apparatus of claim 1, the back cover comprising:
   a back panel; and
   a pair of lateral flanges.

3. The apparatus of claim 2, the tray front comprising:
   a front panel having a distal end and a proximal end;
   a distal flange extending substantially perpendicularly from the distal end of the front panel; and
   a proximal flange extending substantially perpendicularly from the proximal end of the front panel wherein a plane defined by the distal flange is substantially perpendicular to the respective planes defined by the pair of lateral flanges when the back cover and the tray front are in the closed position and wherein the distal flange is separated from the pair of lateral flanges when the back cover and the tray front are in the open position.

4. The apparatus of claim 3 wherein the back cover is sized to receive a first insert and the tray front is sized to receive a second insert wherein the first insert and the second insert have substantially the same dimensions wherein at least one of the back panel and the pair of lateral flanges will each receive at least a portion of the first insert when in place and wherein at least one of the front panel, the distal flange and the proximal flange will each receive at least a portion of the second insert when in place.

5. The apparatus of claim 1 wherein the back cover and the tray front form a six sided enclosure in the closed position and wherein a first insert may be inserted into the back cover and a second insert may be inserted into the tray front so that when the back cover and the tray front are in the closed position a portion of at least one of the first insert and the second insert is viewable within at least one of the six sides from the exterior of the apparatus.

6. The apparatus of claim 1, the means for containing the plurality of media discs within the tray front is configured to contain the plurality of media discs in a cascade relation.

7. The apparatus of claim 1 wherein the tray is seated in the tray front in a hinged relation so that the tray may be articulated between a first position and a second position.

8. The apparatus of claim 1, the means for grasping the plurality of media discs when placed within the plurality of slots comprising:
   a pair of arms integral with the base and sufficiently spaced apart for receiving the plurality of discs there between wherein at least one of the arms is sufficiently flexible to be urged away from the other arm when a disc is inserted there between so that a force is created grasping the disc between the pair or arms.

9. The apparatus of claim 8, the means for grasping the plurality of media discs when placed within the plurality of slots further comprising:
   a second plurality of slots integral to at least one of the pair of arms, the second plurality of slots corresponding with the first plurality of slots such that the edge of a media disc may be inserted within a respective one of the second plurality of slots that will guide the edge of the disc into a corresponding slot of the first plurality of slots.

10. The apparatus of claim 8 wherein the cartridge contains the plurality of media discs within the tray in a cascade relation.

11. The apparatus of claim 1 wherein the back cover and the tray front are configured such that when the back cover and the tray front are in the open position the tray front extends in a plane that is oblique to a plane defined by the back cover so that the plurality of media discs are openly displayed in a cascade relation.

12. The apparatus of claim 11 further comprising:
   a tray seated within a base portion of the tray front in a hinged relation such that when the back cover and the tray front are in the open position the tray may be articulated to a first position so that one or more of the plurality of media discs may be removed from or inserted into the tray in a plane that is oblique to a plane defined by the tray front.

13. An apparatus for containing and displaying a plurality of media discs, the apparatus comprising:
   a back cover;
   a tray front coupled with the back cover in a hinged relation so that the back cover and tray front may be articulated between an open position and a closed position wherein the apparatus may be used to display the plurality of media discs when the tray front and the back cover are in the open position; and
   means for containing the plurality of media discs within the tray front comprising:
   a tray seated within a base portion of the tray front;
   a cartridge removably insertable within the tray, the cartridge comprising:
   a base;
   a first plurality of slots integral to the base for receiving a respective lower edge of a respective media disc when inserted within the cartridge;
   a pair of arms integral with the base and sufficiently spaced apart for receiving the plurality of discs there between wherein at least one of the arms is sufficiently flexible to be urged away from the other arm when a disc is inserted there between so that a force is created grasping the disc between the pair or arms;
   a second plurality of slots integral to a first one of the pair of arms, the second plurality of slots corresponding with the first plurality of slots such that the edge of a media disc may be inserted within a respective one of the second plurality of slots that will guide the edge of the disc into a corresponding slot of the first plurality of slots; and
   a third plurality of slots integral with a second one of the pair of arms wherein the first plurality of slots, the second plurality of slots and the third plurality of slots are aligned with each other to define a respective plurality of substantially parallel planes whereby respective discs of the plurality of media discs are held within in respective ones of the parallel planes when inserted thin respective slots defining the respective parallel planes.

14. The apparatus of claim 13 wherein each of the pair of arms includes a curvilinear distal end having a radius of curvature that is substantially the same as a radius of curvature of a respective media disc.

15. An apparatus for containing and displaying a plurality of media discs, the apparatus comprising:
   a back cover;
   a tray front coupled with the back cover in a hinged relation so that the back cover and tray front may be articulated between an open position and a closed position wherein the apparatus may be used to display the plurality of media discs when the tray front and the back cover are in the open position; and
   means for containing the plurality of media discs within the tray front comprising:
   a tray seated within a base portion of the tray front;
   a cartridge removably insertable within the tray, the cartridge comprising:
   a base;
   a first plurality of slots integral to the base for receiving a lower edge of a respective media disc when inserted within the cartridge; and
   a pair of arms integral with the base and sufficiently spaced apart for receiving the plurality of discs there between such that each of the arms is sufficiently flexed away from the other arm as a disc is inserted there between to create a force against the lateral edges of the respective disc and grasp the disc between the pair of arms.

16. The apparatus of claim 15 further comprising:
   a second plurality of slots integral with a first one of the pair of arms;
   a third plurality of slots integral with a second one of the pair of arms wherein the first plurality of slots, the second plurality of slots and the third plurality of slots are aligned with each other to define a respective plurality of substantially parallel planes whereby respective discs of the plurality of media discs are held within in respective ones of the parallel planes when inserted within respective slots defining the respective parallel planes.

17. An apparatus for containing and displaying at least one object, the apparatus comprising:

a back cover;

a tray front connected with the back cover in a hinged relation for articulating the apparatus between an open position and a closed position;

a tray seated within a base portion of the tray front in a hinged relation for articulating the tray between a first position and a second position wherein an object may be displayed within the tray at a plurality of angles to the horizontal when the apparatus is open and a cartridge removably insertable within the tray, the cartridge comprising a base and a pair of flexible arms extending from the base, the pair of arms sufficiently spaced from each other so that when an object is inserted there between a sufficient force is created against the object to secure it between the flexible arms.

18. The apparatus of claim 17 further comprising:

means for urging the pair of flexible arms toward each other when the apparatus is in the closed position.

19. An apparatus for containing and displaying at least one object, the apparatus comprising:

a back cover comprising a back panel and a pair of lateral flanges;

a tray front comprising a distal end and a base portion, the tray front connected with the back cover in a hinged relation so that the apparatus may be articulated between an open position and a closed position;

a distal flange integral with the distal end of the tray front wherein the distal flange is seated proximately between a pair of respective upper ends of the pair of lateral flanges when the apparatus is in the closed position; and means for containing the at least one object in the tray front so that when the apparatus is in the open position the at least one object is displayed and may be removed from the apparatus, the means for containing comprising:

a pair of flexible arms extending from the base portion of the tray front and sufficiently spaced from each other so that when the at least one object is inserted there between a sufficient force is created against the at least one object to secure it between the flexible arms.

20. The apparatus of claim 19 further comprising:

a tray seated within the base portion of the tray front for receiving the means for containing.

21. The apparatus of claim 20 wherein the tray is seated within the tray front in a hinged relation so that the tray may be articulated between a first position and a second position.

22. The apparatus of claim 19 further comprising:

means for urging the pair of flexible arms toward each other when the apparatus is in the closed position.

23. The apparatus of claim 19 wherein the back panel defines a plane that is oblique to a plane defined by a front panel of the tray front when the apparatus is in the open position.

24. An apparatus for containing and displaying at least one object, the apparatus comprising:

a back cover comprising a back panel and a pair of lateral flanges;

a tray front comprising a distal end and a base portion, the tray front connected with the back cover in a hinged relation so that the apparatus may be articulated between an open position and a closed position;

a distal flange integral with the distal end of the tray front wherein the distal flange is seated proximately between a pair of respective upper ends of the pair of lateral flanges when the apparatus is in the closed position;

a tray seated within the base portion of the tray front for receiving a means for containing the at least one object in the tray front so that when the apparatus is in the open position the at least one object is displayed and may be removed from the apparatus, the means for containing comprising:

a base;

a pair of flexible arms extending from the base and sufficiently spaced from each other so that when the at least one object is inserted there between a sufficient force is created against the at least one object to secure it between the pair of flexible arms.

* * * * *